United States Patent [19]

Bates et al.

[11] Patent Number: 4,741,216

[45] Date of Patent: May 3, 1988

[54] SPLIT FLOWTUBE FOR MOLTEN METAL MAGNETIC FLOWMETER

[75] Inventors: Robert C. Bates, Allison Park; Richard F. Kwiatkowski, Wexford, both of Pa.

[73] Assignee: Mine Safety Appliances Company, Pittsburgh, Pa.

[21] Appl. No.: 19,197

[22] Filed: Feb. 26, 1987

[51] Int. Cl.$^4$ .......................... G01F 1/58; G01F 15/04
[52] U.S. Cl. ............................... 73/861.12; 73/272 R; 138/156
[58] Field of Search ............... 73/861.12, 861.13, 201, 73/272, 273; 138/156, 157, 162, 164, 166, 170, 171, 159

[56] References Cited

U.S. PATENT DOCUMENTS 4,112,568 9/1978 Hale ................................ 138/156 X
4,434,667 3/1984 August et al. ............. 73/861.13 X

FOREIGN PATENT DOCUMENTS 68729 1/1916 Switzerland ..................... 138/157

Primary Examiner—Charles A. Ruehl

[57] ABSTRACT

A closed flowtube for measuring the volumetric flow rate of a conductive molten metal that can be split apart, to facilitate cleaning and repair, and then re-assembled.

1 Claim, 1 Drawing Sheet

SPLIT FLOWTUBE FOR MOLTEN METAL MAGNETIC FLOWMETER

FIELD OF THE INVENTION

This invention relates to the field of measuring volumetric flow rates of conductive molten metals using magnetic flowmeters.

BACKGROUND OF THE INVENTION

In order to measure the flow rate and hence the volume of flow of molten metals, a magnetic flowmeter can be used. Magnetic flowmeters are used due to the extreme temperature of the molten metals that usually run in the 200° F.-3000° F. range.

Magnetic flowmeters known in the prior art such as King, U.S. Pat. No. 3,3566,684 incorporates the use of closed flowtubes through which the molten metal flows when measuring the volumetric flow rate of the metals. The closed flowtube prevents the operator and atmosphere from directly contacting the molten metal so as to prevent injury and atmospheric contamination of the metal. There is an inherent drawback in the use of a closed flowtube. After periodic use, sludge from the liquid metal accumulates inside of the flowtube around the area of the sensing electrodes of the flowmeter. This build-up of sludge decreases the readings of the flowmeter, thereby rendering the meter inaccurate. When this build-up occurs, the flowtube must be replaced resulting in losses due to downtime. The flowtube itself can also be quite expensive especially when the tube must be replaced several times a year. It would be desirable to incorporate a flowtube within a magnetic flowmeter that could be cleaned periodically without having to remove and replace the entire flowtube. This invention provides just such a device.

SUMMARY OF THE INVENTION

The present invention describes a flowtube for magnetic flowmeters for molten metals that can be disassembled for cleaning and then re-assembled without removing the entire flowtube from the system. The present invention provides the unique feature of enabling the operator to remove the top of the flowtube, clean sludge from the electrical contacts and replace the top of the tube, without replacing the entire flowtube or experiencing excessive plant downtime. The present invention discloses a flowmeter that has a flowtube that is approximately tree feet in length. The flowtube is of rectangular outer shape with a round lengthwise channel formed on the inside of the flowtube. The flowtube is split lengthwise creating a top and bottom piece.

The split between the top and bottom is sealed by a high temperature gasket material whenever the flowtube is re-assembled and sealed.

DETAILED DESCRIPTION OF THE PREFERRED EMBODIMENT

Magnetic flowmeters to determine flow rate of conductive molten metals work under the principle that a conductive metal that flows through a magnetic field generates an electromotive force (EMF). The EMF generated by the passage of the metal through the magnetic field is proportional to the volumetric flow rate of the molten metal. By knowing the flow rate of the metal, and knowing the area of the inner flowchannel, the amount of metal passing through the flowtube can be accurately determined.

Figure 1:
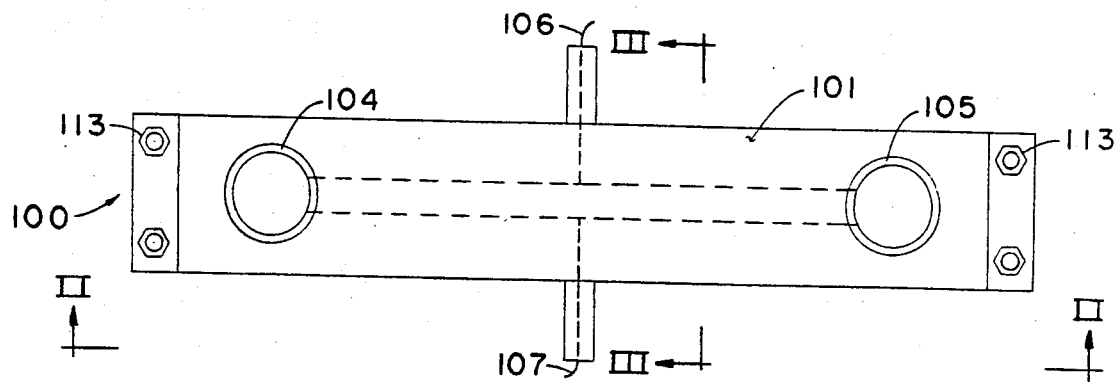
FIG. 1 is a top view of the split flowtube showing inlet and outlet parts.
Figure 2:
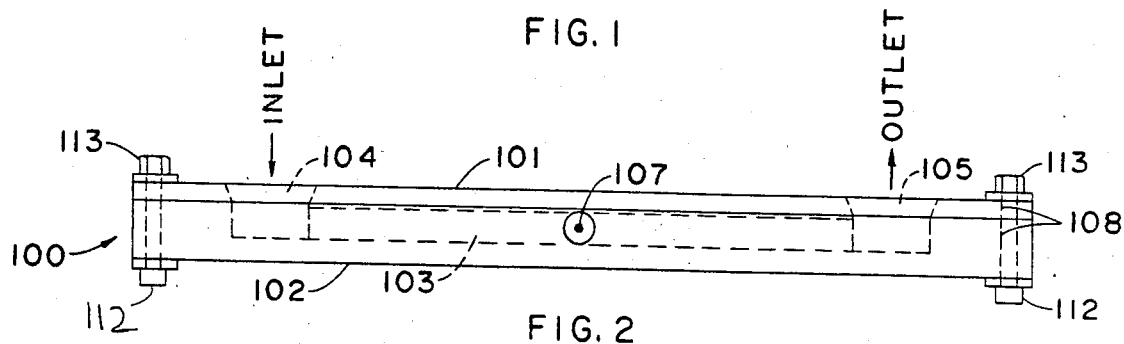
FIG. 2 is a side view of the flowtube.
Figure 3:
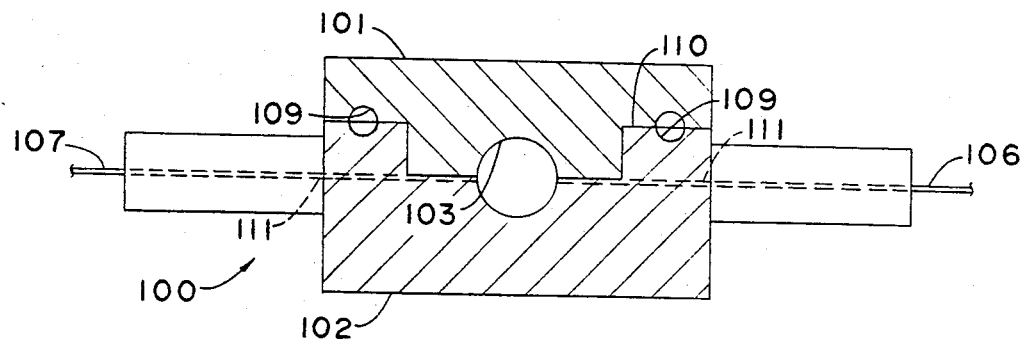
FIG. 3 is a sectional view of the split flowtube.
Figure 4:
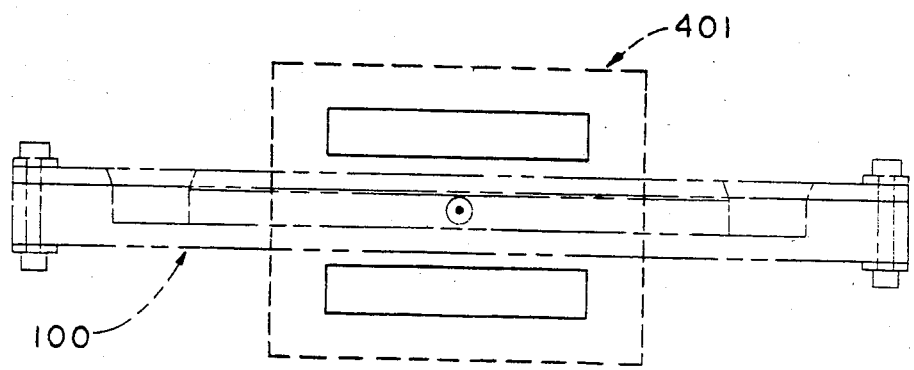
FIG. 4 is a side view of the split flowtube showing the position of the magnets.

Referring now to FIGS. 1, 2 and 3, a top, side and sectional view of the present invention are seen. The flowtube 100 is comprised of two main body sections, a top section 101 and a bottom section 102 in a type of tongue and groove arrangement. The minimum length of the flowtube 100 is determined by dividing the length of the flowtube 100 by the inner diameter of the flow channel 103. The resultant dividend must be no less than 10 for the flowmeter to product accurate results by eliminating asymmetric flow through the measurement area.

Hollowed out along the length of the top and bottom pieces 101 and 102 is a semicircular groove 103. Along both outer edges and running parallel to the semicircular groove 103 are two smaller semicircular grooves 109. When the top piece 101 is fitted on top of the bottom piece 102, the large semicircular channel on the top piece 101 lines up with the large semicircular channel of the bottom piece 102 to form the metal flow channel. Similarly, when the top piece 101 is fitted on top of the bottom piece 102, the small semicircular grooves, along the edges, line up to form circular channels that run parallel to flow channel 103. These circular channels are adapted to receive a gasket material to prevent leaks of metal from occurring along the split line 110. The gasket material can be a high temperature resistant gasket material; such as for example, ceramic rope or ceramic cloth. The flow channel 103 may be of any shape, but is usually circular and ranges in diameter from 1" to 24".

The flow channel 103 can be lined with any material that is impervious to attack by the molten metal that passes through the flowtube. For example, the channel may be lined with aluminum oxide such a mullite when measuring the flow of molten iron or silica carbide when measuring the flow of aluminum. The channel can either be lined with the material or, alternatively, both top and bottom sections of the flowtube can be constructed from the material. The composition material of the flowtube 100 must be non-magnetic and possess low conductivity properties.

Two circular holes 104 and 105 have been bored through the top piece 101. The first hole 104 is adapted to be connected to an inlet pipe (not shown) and the second hole 105 is adopted to be connected to an outlet pipe (not shown). When the system is operated, molten metal is forced or pumped through the inlet pipe (not shown), through the first hole 104 and into the interior flow channel 103. The metal flows through the interior channel 103, out of the second hole 105 and into the outlet pipe (not shown).

Two additional conduit holes 111 are positioned at the center of the flow channel 103 and bored directly into the flow channel 103. One conduit hole is positioned 180° apart from the second conduit hole 111; both being perpendicular to the flow channel 103. By way of each conduit hole 111, wire leads 106 and 107 are inserted directly into the flow channel 103. The wire leads 107 and 106 are cemented into place using a high temperature ceramic adhesive. These leads 106 and 107 are the electrodes used to read the EMF that is generated by the molten metal passing through the flowtube.

Finally, at each end of the flowtube 100, two additional holes 108 are drilled through the ends of the top piece 101 and bottom piece 102. Into each of these holes 108, a bolt 112 act as the securing mechanisms to seal together the top piece 101 and the bottom piece 102 of the flowtube.

Referring now to FIG. 2, a side view of the flowtube 100 in use, is shown. Above and below the flowtube 100, permanent magnets 401 are positioned so that the magnetic flux field passes through the flowtube 100 and molten metal at right angles to the molten metal. As the molten metal passes through the magnetic flux field, imposed on the flowtube 100, an EMF is generated. The EMF in the flowtube is measured by using a voltmeter. (not shown). The EMF produced by the flowing metal is proportional to the volumetric flow rate of the metal. Therefore, the higher the flow rate, the greater the EMF and the lower the flow rate, the lower the EMF.

The proportional relationship between the EMF produced by a conductive material, such as a conductive metal, passing through a magnetic field at a given volumetric flow rate is well known in the art.

The preceding description provides details of the preferred embodiment in accordance with the claimed invention. There can, however, be many changes and modifications made to the embodiment without departing from the essential spirit of the invention.

We claim:

1. A molten metal flowtube for a magnetic flowmeter comprising:

an elongated casing comprising a top and bottom piece, each piece having a lengthwise central hollowed-out groove in one face of said piece where said grooves form a center flow channel when said two faces are aligned lengthwise, and where said casing has a means for sealing said top and bottom pieces around the outer edge of said channel when assembled, and where said center channel is comprised of or lined with any material composition that cannot be corroded by the conductive metal that is flowing through said flowtube, and where said lining material composition is non-magnetic and has low conductive properties; and, a means for securing together said top and bottom pieces.

* * * * *